(12) United States Patent
Wyser

(10) Patent No.: US 8,748,024 B2
(45) Date of Patent: Jun. 10, 2014

(54) BATTERY

(75) Inventor: Maurus Wyser, Appenzell (CH)

(73) Assignee: Swissbatt AG, Appenzell Steinegg (CH)

( * ) Notice: Subject to any disclaimer, the term of this patent is extended or adjusted under 35 U.S.C. 154(b) by 1019 days.

(21) Appl. No.: 12/265,490

(22) Filed: Nov. 5, 2008

(65) Prior Publication Data

US 2009/0136831 A1 May 28, 2009

(30) Foreign Application Priority Data

Nov. 27, 2007 (EP) .................................... 07405336

(51) Int. Cl.
- *H01M 4/00* (2006.01)
- *H01M 2/10* (2006.01)
- *H01M 2/00* (2006.01)
- *H01M 2/02* (2006.01)

(52) U.S. Cl.
USPC ................... 429/98; 429/94; 429/96; 429/97; 429/100; 429/163; 429/164; 429/176

(58) Field of Classification Search
USPC ........... 429/94, 96, 97, 98, 99, 100, 163, 164, 429/176
See application file for complete search history.

(56) References Cited

U.S. PATENT DOCUMENTS

| 5,556,722 | A | 9/1996 | Narukawa et al. | |
|---|---|---|---|---|
| 6,280,874 | B1 * | 8/2001 | Hensley et al. | 429/98 |
| 7,753,546 | B2 * | 7/2010 | Kuelbs | 362/102 |
| 2003/0064292 | A1 | 4/2003 | Neudecker et al. | |
| 2004/0072063 | A1 | 4/2004 | Wyser | |
| 2004/0248000 | A1 | 12/2004 | Hall et al. | |
| 2005/0233206 | A1 * | 10/2005 | Puttaiah et al. | 429/120 |

FOREIGN PATENT DOCUMENTS

| EP | 0 144 757 B1 | 6/1985 |
|---|---|---|
| EP | 1 100 138 A1 | 5/2001 |
| EP | 1 244 169 A1 | 9/2002 |
| EP | 1 398 841 A1 | 3/2004 |

* cited by examiner

*Primary Examiner* — Eugenia Wang
(74) *Attorney, Agent, or Firm* — Birch, Stewart, Kolasch & Birch, LLP

(57) ABSTRACT

A battery comprises a battery housing and an electrode which is accommodated in the battery housing. Outer faces of the battery housing substantially form the shape of a hollow body which has an accommodation space for accommodating at least a substantial portion of a device which is to be supplied with power by the battery. An outer casing surface of the battery housing can therefore form a portion of a housing of the device. Since the battery housing protects both the active portion of the battery enclosed therein and the components of the device accommodated in the accommodation space of the battery, and a separate device housing and battery housing can therefore be largely avoided, there is a resultant saving in weight and volume. The freedom of design for devices which are provided with batteries is also increased.

13 Claims, 3 Drawing Sheets

BATTERY

FIELD OF THE INVENTION

The invention relates to a battery comprising a battery housing and an electrode which is accommodated in the battery housing. The invention also relates to a device with a battery of this type.

BACKGROUND OF THE INVENTION

Electronic devices are becoming increasingly widespread. At the same time, these can be produced in ever more compact forms. In such miniaturized devices, for example in those which are carried by the user over relatively long periods of time or permanently (such as hearing aids, insulin pumps or other medication dispensers etc.), it is important for the battery for supplying power to likewise be as compact and lightweight as possible while at the same time also being powerful.

Rechargeable batteries with standard shapes and a metal housing are conventionally used for such devices. These rechargeable batteries are inserted directly or as a potential-free packet with an integrated protective circuit into an opening in the device which is intended for it. The space required for a rechargeable battery and a rechargeable battery compartment and the weight of the metal housing of the rechargeable battery restrict the design for various applications.

High energy densities can be achieved with wound batteries, as described, for example, in EP 0 144 757 (GTE Government Systems) or U.S. Pat. No. 5,556,722 (Sanyo). A winding ("jelly roll") with an active cathode strip and an active anode strip is accommodated in a sealed housing. The common helically wound strips are electrically separated by a separator, with a liquid electrolyte or a polymer serving as the ion conductor. Electrical conductors connect the strips to current connections (negative and positive poles of the battery) which are arranged on the outside of the housing.

EP 1 100 138 A1 (Wyon AG) discloses a wound battery which has a space-saving design and therefore permits a high capacity together with a low space requirement. In this case, the current connection is formed by small tubes which project into the housing and at the same time serve as supports for the electrode winding which is impregnated with electrolyte.

EP 1 398 841 A1 (Wyon AG) discloses a further wound battery which has a screw-connected, gas-tight contact bushing. This design is compact, it is additionally particularly well-suited to rechargeable batteries with plastic housings which can be produced with a lower weight than conventional rechargeable batteries with metal housings.

SUMMARY OF THE INVENTION

The two last-mentioned solutions already provide a considerable saving in weight and volume. The problem addressed by the invention is that of providing a battery from the technical field mentioned in the introduction which takes up even less space and in which the weight of a device which is provided with the battery can be reduced further.

The solution to the problem is defined by the features of Claim 1. According to the invention, the outer faces of the battery housing substantially form the shape of a hollow body which has an accommodation space for accommodating at least a substantial portion of a device which is to be supplied with power by the battery. The outer casing surface of the battery housing can therefore form a portion of the housing of the device.

The battery housing encloses the active portion of the battery (that is to say, in particular, the electrodes and the electrolyte and possibly other elements) and closes these off from the environment and from the device accommodated in the accommodation space formed by the overall shape of the battery housing, in particular in a gas-tight manner. The following order, for example, is produced in cross section: outer casing of the battery housing—active portion of the battery—inner casing of the battery housing—accommodation space—inner casing of the battery housing—active portion of the battery—outer casing of the battery housing.

The battery and the accommodation space do not only contain elements for making electrical contact (for example contact pins) and/or for mechanically fixing the battery on the device, as in certain known solutions, but other components of the device. The battery can be dimensioned such that substantially the entire device can be accommodated in the accommodation space; the battery housing therefore forms the substantial portion of the housing for the device. As an alternative, a portion of the device projects out of the accommodation space.

The battery housing protects both the active portion of the battery (that is to say the electrodes, the electrolyte and other constituent parts) enclosed therein and the components of the device accommodated in the accommodation space of the battery. Since a separate device housing and battery housing can therefore be largely avoided, there is a resultant saving in weight and volume.

In conventional battery-operated devices, an accommodation space for the, for example cylindrical or substantially cuboidal, battery has generally had to be provided in the interior of the device housing during the design process. This has restricted the freedom of design, in particular the freedom of arrangement of the device components. If a battery according to the invention is used, the components of the device can be accommodated in a simply connected space. In addition to the reduced weight and volume due to the saving on housing walls, the design of the battery according to the invention therefore also permits greater freedom of design, which in turn permits even more compact and/or ergonomic design of the device. The shape of the battery housing can be selected in such a way that it can be matched to the desired shape and the desired functionality of the device as well as possible.

The battery according to the invention is suitable, in particular, for supplying power to miniaturized electronic devices, for example hearing aids, portable automatic medication dispensers etc. Batteries for such applications generally have an energy content of 1 Ah or less, in particular approximately 10-500 mAh. Typical dimensions (for example edge lengths) of a battery of this type are in the range of 5-50 mm. However, the invention can, in principle, be used in smaller or larger batteries too.

The accommodation space is advantageously accessible from the outside in such a way that the portion of the device to be accommodated in the accommodation space can be inserted into said accommodation space. The accommodation space can be in the form, in particular, of a recess in the overall shape of the battery. This permits simple insertion of the device part (or the device), after which the inserted part of the device, with the exception of the rear face, is surrounded and therefore protected by the battery.

The outer faces of the battery housing preferably substantially form the shape of a hollow cylinder. According to the general definition, a cylinder is a body which is bounded by two parallel, planar surfaces (base surface and top surface) and a casing or cylindrical surface which is formed by straight parallel lines, that is to say said cylinder is produced by shifting a planar directrix curve along a straight line which is not in this plane. It therefore must not be a straight cylinder and in particular not a circular cylinder; the directrix curve can also have an oval or irregular shape, for example. The hollow cylinder is formed, in particular, such that a maximum wall thickness of the hollow cylinder is at most a third of a minimum inside diameter (that is to say the minimum diameter of the accommodation space). The battery therefore has a thin wall with respect to the accommodation space.

A hollow-cylindrical shape is particularly advantageous when the electrode of the battery is wound. The winding can then be designed, specifically in a simple manner, such that it wraps around the accommodation space which is formed by the shape of the battery housing. This arrangement permits production of a thin-walled battery according to the invention with a high energy density.

A wound electrode can also be accommodated, in principle, in a non-hollow-cylindrical housing. Secondly, it is also possible for batteries of different design to be accommodated in the hollow body-like housing according to the invention, in particular in a hollow-cylindrical housing.

In a wound electrode, a ratio between a winding width and a winding height of the wound electrode is at least 5:1. In this case, the winding width is understood to be the width of the electrode strips and the winding height is understood to be the thickness of the electrode strips, which lie one on the other, and the separator. Compact battery housings with a low wall thickness (housing thickness) can be produced with dimensions of this size.

A hollow-cylindrical battery housing advantageously has a first end face in which an entrance to the accommodation space is formed, and a second end face which is situated opposite the first end face and is closed off by a covering face. This permits simple accommodation of the device in the accommodation space of the battery housing.

A device can therefore have for example a base plate, in particular a PCB (printed circuit board) which can be fixed on the entrance-side end face of the battery. The components of the device are mounted on the base plate and are accommodated in the accommodation space of the battery in the assembled state. The components of the device are therefore protected on all sides by the base plate of the device and by the casing surfaces and the covering face of the battery housing. The base plate of the device can also be covered by a device cover if desired. Said device cover can have openings for display or operator-control elements of the device.

The components of the device preferably comprise a safety circuit, a charging circuit and a transmission coil for wire-free charging of the battery and other device-specific components (for example a control system, a microphone, an amplifier, a loudspeaker, a pump etc.).

The base plate is advantageously screw-connected on the receptacle-side end face, this permitting secure, simple and releasable fixing. The screw connection can be made with screws which are passed through an opening in the base plate and are screwed into an internal thread on the battery housing. If the battery housing is in the form of a straight, circular hollow cylinder, a thread can also be formed directly in the inner casing surface of the battery housing, and the base plate can be firmly screwed onto the said thread by means of an external thread which is formed or provided on it so as to be compatible.

Other ways of fixing the base plate to the battery housing are also feasible, for example a clip connection or a permanent connection, such as a welded connection.

Electrical contact is advantageously made with contact connections of the battery at the same time by fixing the device on the battery. To this end, in a first embodiment, the contact connections can be arranged on the first end face of the battery, that is to say on that end face in which the entrance to the accommodation space is formed. The contact points of the device are formed, in particular, in a corresponding position on the inner face of a base plate of the device. Contact can be made in this way in a very space-saving and simple manner.

In a further embodiment, the contact connections are arranged on an outer face of the battery housing which adjoins the accommodation space. Said contact connections are contacted by corresponding contact areas of the base plate or of the device. This variant permits flexible arrangement of the contact areas on the device. The contact areas are additionally protected in the interior of the hollow body-like battery to an optimum degree.

The battery housing is preferably composed of an outer housing part and an inner housing part. The two housing parts are welded to one another in a gas-tight manner in particular. A design of this type is both simple and stable. In the case of a wound battery, the winding can be inserted into the outer housing part in a simple manner, after which the inner housing part is introduced. The two parts can be reliably connected by means of two gas-tight weld seams. In the case of a battery housing in the form of a hollow cylinder which is closed off at the end on one side, the outer housing part can form, in particular, the outer casing surface and the end-side closure, while the inner housing part forms the inner casing surface and that annular end face which is opposite the closed-off end.

As an alternative, housings which are divided differently or which comprise more than two parts are also feasible. The housing parts can also be connected in another way, for example by gas-tight adhesive connections or by parts which are provided with gas-tight sealing elements being screw-connected to one another.

The outer casing surface of the battery housing, in particular the entire battery housing, is advantageously produced from a gas-tight and chemicals-resistant plastic. The suitable plastics proposed are, in particular, liquid-crystalline polymers (LCP) (commercially obtainable, for example, as Zenite® or Vectra®). These materials are extremely stiff and durable and also chemicals-resistant, while having a low weight. If the device comes into direct contact with the skin of the wearer (for example in the case of a hearing aid), a skin-compatible plastic should also be used.

Further advantageous embodiments and combinations of features of the invention can be found in the following detailed description and in all of the patent claims.

BRIEF DESCRIPTION OF THE DRAWINGS

In the drawings used to explain the exemplary embodiment.

In principle, identical parts are provided with the same reference symbols in the figures.

DETAILED DESCRIPTION OF THE INVENTION

Figure 1:
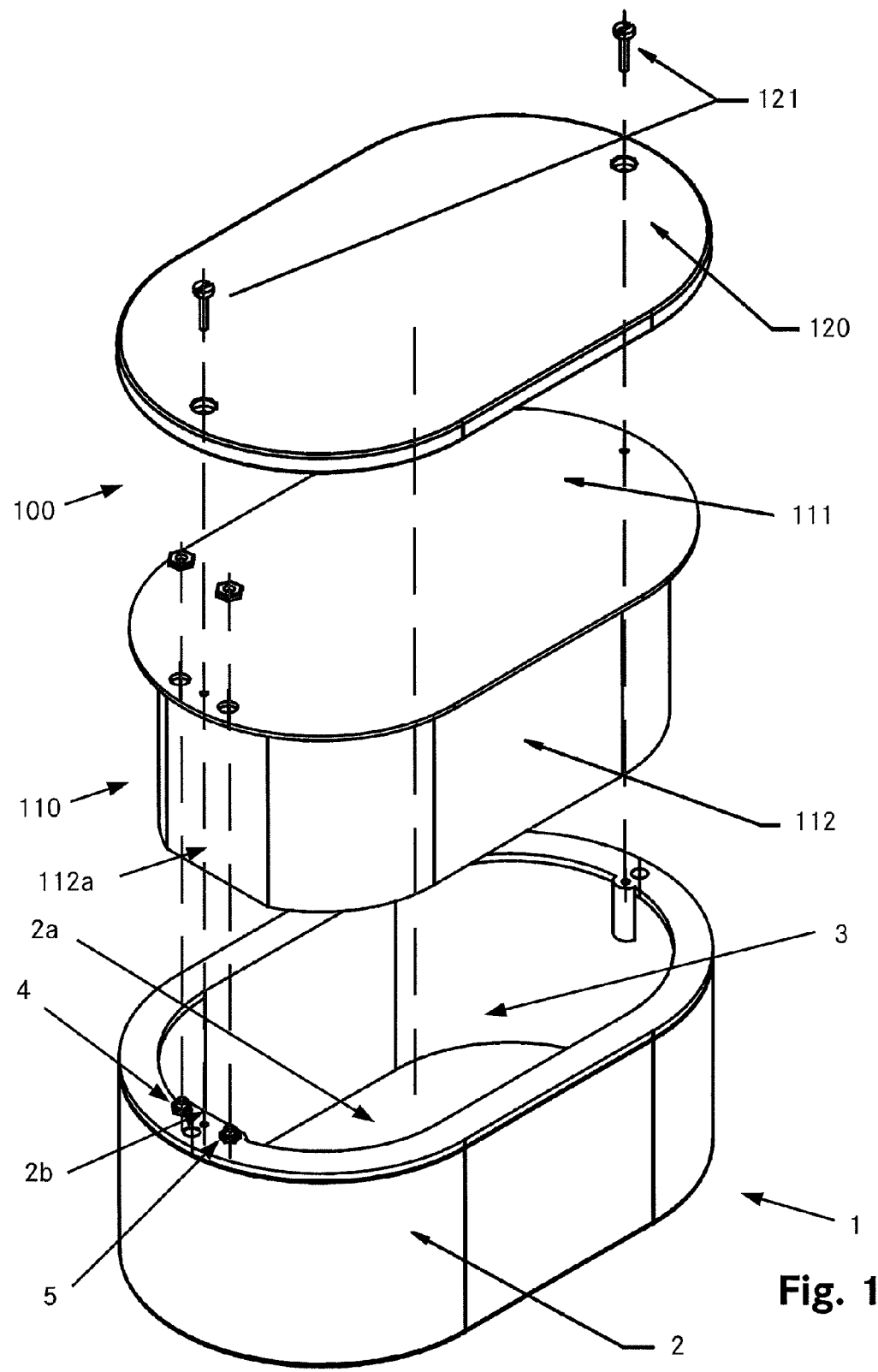
FIG. 1 shows an exploded illustration of a battery according to the invention and a device which is supplied with power by said battery.

FIG. 1 shows an exploded illustration of a battery according to the invention and a device which is supplied with power by the battery. The shape of the battery 1 corresponds substantially to a straight hollow cylinder with a base surface in the form of an oval ring. The length of the oval is in a ratio of approximately 2:1 with the width. The battery comprises a battery housing 2 which is formed in a corresponding hollow-cylindrical manner and surrounds an accommodation space 3 in the manner of a casing. The battery housing 2 is formed in such a way that the wall thickness of the hollow cylinder corresponds to approximately ⅛ of the width of the accommodation space. The battery is a compact battery with small geometric dimensions; it is, for example, a few millimeters (for example up to 20 mm) high and several (for example 10 to 30 mm) millimeters wide. It has a capacity of, for example, approximately 300 mAh. The battery housing comprises a lower covering face 2*a* which closes off the accommodation space 3 at the bottom in a sealed manner. That region of the lower covering face 2*a* which adjoins the accommodation space 3 can contain—if required—cable and, respectively, hose bushings. An output conductor pin 4 for the positive pole and an output conductor pin 5 for the negative pole project out of the battery housing 2 in the edge region of that end which is situated opposite the covering face 2*a*. The battery 1 is illustrated in detail in FIGS. 2 and 3 and is also described in greater detail in conjunction with these figures.

The device 100 comprises an insert 110 and a device cover 120. The insert 110 comprises a base plate 111 which is formed by a PCB (printed circuit board) and on which the components of the device (in particular electronic components such as firstly a safety circuit and an inductive charging circuit, including transmission coil, and secondly device-specific components such as a pump, a microphone, a magnet, operator-control elements etc.) are mounted. In the illustrated version, the components are surrounded by a thin housing wall 112, with an annular region of the base plate 111 projecting beyond the housing wall 112. Since the protective function for the device 100 is seen in this region of the battery 1 in the assembled state (that is to say when the device is inserted), this housing wall 112 can, in principle, also be dispensed with or it can be designed with a considerably lower height.

The insert 110 is formed in such a way that it can be inserted in the accommodation space 3 which is formed by the battery housing 2 in a suitable manner, with a flattened area 112*a* of the housing wall 112, which interacts with a flattened area 2*b* of the battery housing 2, ensuring that the insert 110 can be guided into the accommodation space only with one orientation.

When the insert 110 is in the inserted state, the annular region of the base plate 111 which projects beyond the housing wall 112 is supported on the battery housing 2. Four holes are also formed in this region. The output conductor pins 4, 5 which project beyond the battery housing 2 pass through two of these holes. The output conductors are designed in accordance with European patent application EP 1 398 841 A1 (Wyon AG), that is to say they permit a gas-tight connection, which can be mechanically tightened, between an outer contact connection and the output conductor pins which are arranged inside the battery housing 2. In the present case, the output conductor pins 4, 5 are in the form of small tubes and have an internal thread into which a threaded rod is screwed. The free end of said threaded rod projects on the outside of the battery housing 2 in the assembled state of the battery 1. Suitable nuts can be screwed onto the corresponding portion, so that the winding which is held on the output conductor pins and therefore the battery 2 are firmly screw-connected to the insert 110. The connection between the device 100 and the negative and positive poles is also established by means of the screw connection.

The device cover 120 can be screw-connected to the battery 1 through the two further openings in the base plate 111 by two metric screws 121 being passed from the outside of the device cover 120, through openings in the device cover 120 and the abovementioned openings in the base plate 111, into receptacles with an internal thread which are formed in the battery housing 2. After being tightened, the heads of the screws 121 are recessed in corresponding receptacles in the housing cover 120. After the device cover 120 is fitted, the functional components of the device 100 are well protected on all sides. The housing cover 120 additionally covers the output conductor pins 4, 5, which are conductively connected to the battery 1, or the nuts screwed onto them. Furthermore, cutouts for operator-control and display elements of the device 100 can be provided in the device cover 120.

Figure 2:
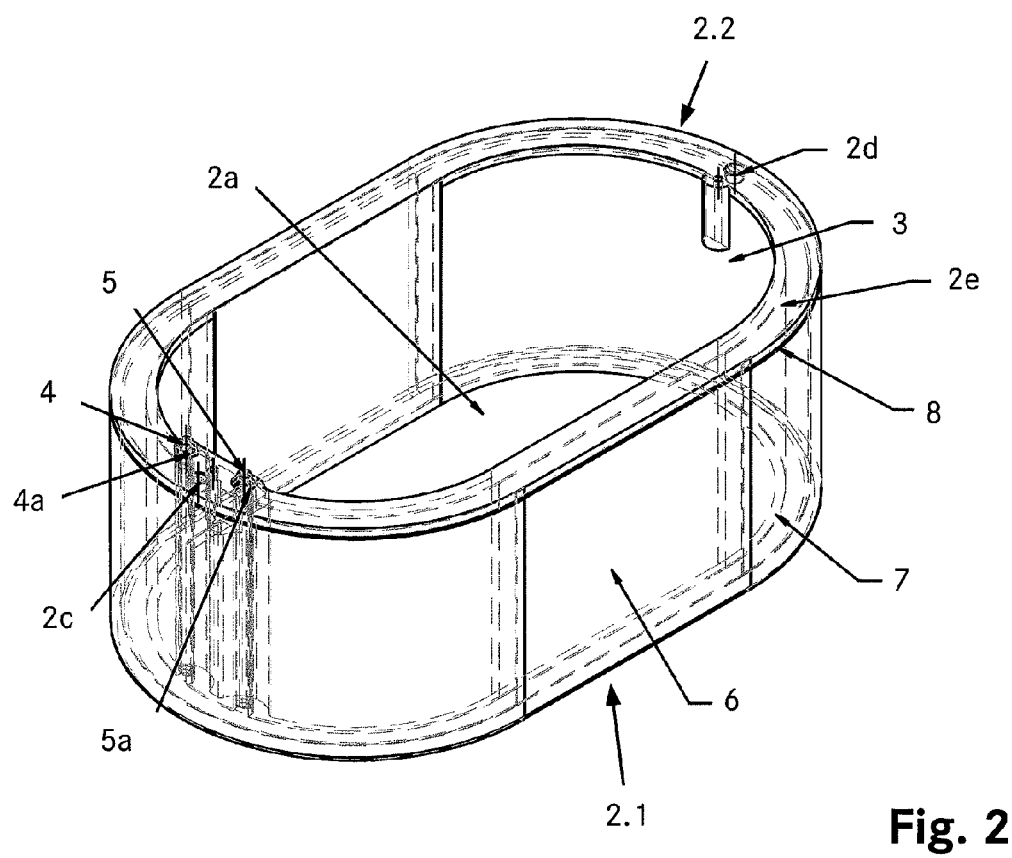
FIG. 2 shows an oblique view of the battery.
Figure 3:
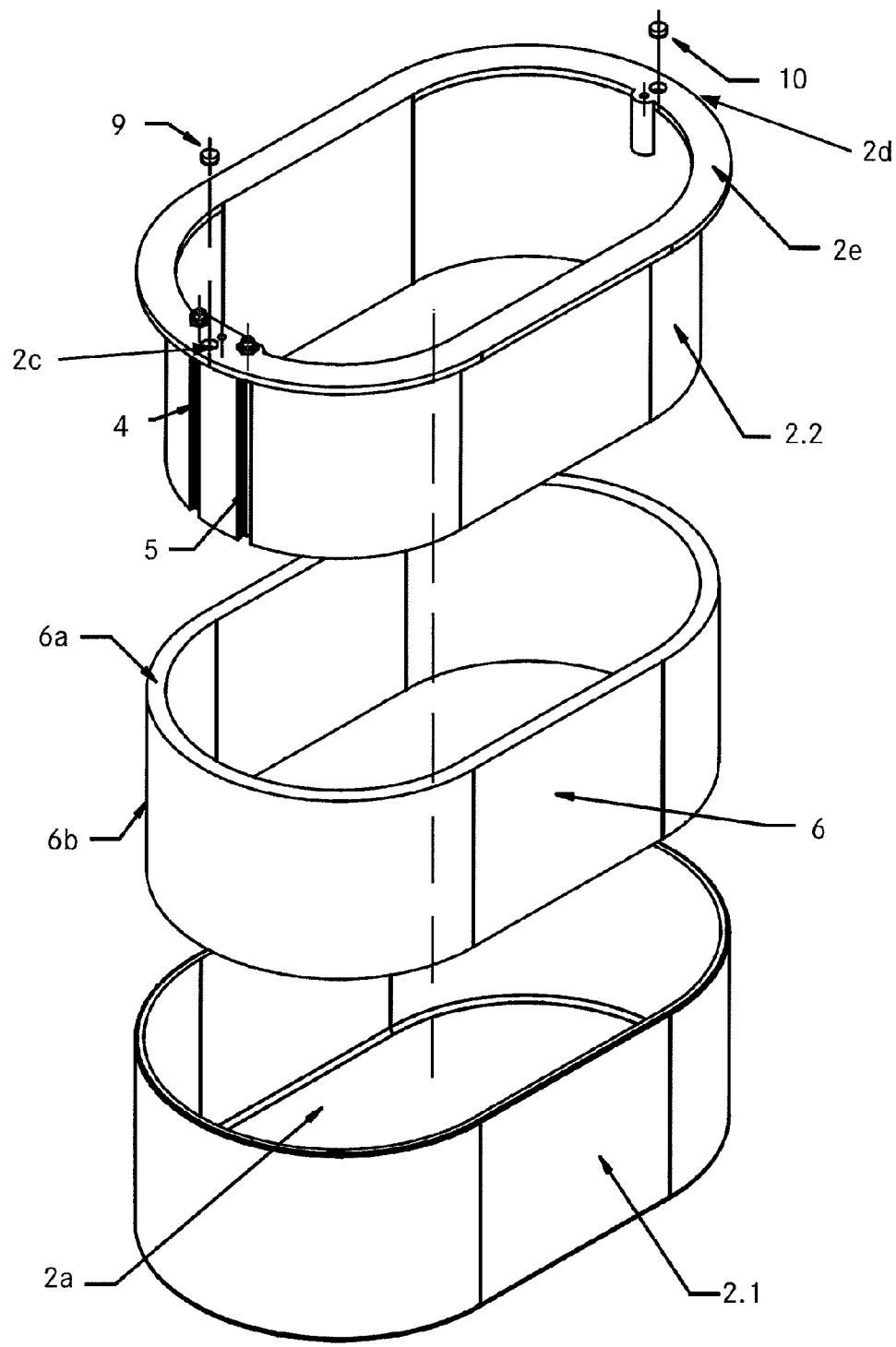
FIG. 3 shows an exploded illustration of the battery.

FIG. 2 shows an oblique view, and FIG. 3 shows an exploded illustration of the battery 1. The active components of the battery 1, specifically a winding 6 which is constructed in a manner known per se and comprises an anode strip and a cathode strip between which a separator strip is arranged, are accommodated in the battery housing 2. The strips are dimensioned in such a way that a ratio between the winding width 6*b* and the winding height 6*a* is approximately 5:1 (see FIG. 3). The carrier foil of the cathode strip is welded to the first metal output conductor pin 4, the carrier foil of the cathode strip is welded to the second metal output conductor pin 5, as a result of which a simple and reliable connection is established. Two strips (two anode or two cathode strips) can also proceed from an output conductor pin. Strips which are coated on both sides can also be used. The winding 6 is impregnated with an electrolyte. The output conductor pins 4, 5 are held on the battery housing 2 by means of fixing nuts 4*a*, 5*a* which are screw-connected on the outside of the housing to the external threads in the region of the free end of the output conductor pins 4, 5.

The battery housing 2 is composed of two parts from a liquid-crystalline polymer (LCP) which is suitable for this application (see FIG. 3 in particular). The plastic is gas-tight and can be provided with a metallization for blocking vapor. The first (outer) housing part 2.1 forms the outer casing and the lower end-side covering face 2*a*. The second (inner) housing part 2.2 forms the inner casing and the annular end face 2*e* which is situated opposite the covering face 2*a*. The flattened area 2*b*, already mentioned above, which bounds the accommodation space 3, the openings for accommodating the screws 121 for fixing the device cover 120 and also two receptacles and passage openings for the output conductor pins 4, 5 are formed in the second housing part 2.2. The second housing part 2.2 also has two openings 2*c*, 2*d* in the annular end face.

The battery 1 is assembled as follows: first of all, the winding 6 is inserted into the first housing part 2.1, with the output conductor pins 4, 5 projecting upward out of the winding 6 by way of their free ends. The second housing part 2.2 can now be mounted, with the free ends of the output conductor pins 4, 5 passing to the outside through the corresponding openings in the second housing part 2.2. The housings are now connected to one another by means of two gas-tight weld seams. The inner gas-tight weld seam 7 runs between the lower end of the inner casing surface of the second housing part 2.2 and the base surface of the first housing part 2.1. The outer gas-tight weld seam 8 runs between the free end of the annular end face of the second housing part 2.2 and the free edge of the first housing part 2.1. The winding 6 can now be fixed on the battery housing 2 with the aid of the abovementioned fixing nuts, with the bushing being simultaneously closed off in a gas-tight manner in accordance with EP 1 398 841 A1 (Wyon AG).

Then, the electrolyte can be poured in through the first opening 2c in the annular end face, with the interior of the battery housing 2 being ventilated through the second opening 2d. After the electrolyte is poured in, the two openings are permanently closed by welding closure covers 9, 10 into place. The battery 2 is then ready for use.

The invention is not restricted to the illustrated exemplary embodiment. The shape and design of the battery can be also selected differently, for example, in order to take into account requirements, regarding the size of the device or the ergonomics of the device. For example, the battery does not necessarily have to have a constant cross section, but instead said cross section can widen in the direction of the receptacle-side end. The shape of the base surface can also be different, for example round or substantially rectangular. The battery housing can comprise two components and be produced, for example, using an insert-molding method. Additional decorative or informative elements can also be fitted to the outside of the battery housing.

Furthermore, the output conductors can also lead directly to the accommodation space, that is to say to the inner casing surface of the battery housing where the contacts for the device are formed, instead of to the accommodation space-side end of the battery. As a result, the base plate of the device can be dispensed with or the device cover can be formed directly on the device. Instead of a screw connection, the device cover (or the base plate) can also be welded to the receptacle-side end face of the battery housing.

In a further embodiment, the output conductors are formed as plugs outside the battery housing. The corresponding sockets are advantageously fitted on the base plate of the device.

In summary, it can be established that the invention provides a battery which takes up even less volume compared with the prior art and with which the weight of a device which is provided with the battery can be further reduced.

LIST OF REFERENCE SYMBOLS

| | |
|---|---|
| 1 | Battery |
| 2 | Battery housing |
| 2.1 | First (outer) housing part |
| 2.2 | Second (inner) housing part |
| 2a | Lower covering face |
| 2b | Flattened area |
| 2c | Opening |
| 2d | Opening |
| 3 | Accommodation space |
| 4 | Output conductor pin |
| 4a | Fixing nut |
| 5 | Output conductor pin |
| 4b | Fixing nut |
| 6 | Winding |
| 6a | Winding height |
| 6b | Winding width |
| 7 | Weld seam |
| 8 | Weld seam |
| 9 | Closure cover |
| 10 | Closure cover |
| 100 | Device |
| 110 | Insert |
| 111 | Base plate |
| 112 | Housing wall |
| 112a | Flattened area |
| 120 | Device cover |

The invention claimed is:

1. A battery comprising a battery housing and an electrode which is accommodated in the battery housing, whereas outer faces of the battery housing form a shape of a hollow cylinder having two parallel planar end faces and a cylindrical face, said battery housing providing an accommodation space for accommodating at least a portion of a device which is to be supplied with power by the battery, said accommodation space being surrounded by said cylindrical face of said battery housing and having an entrance on a first of said two parallel end faces of said battery housing, the battery housing further comprising a covering face which entirely closes off the accommodation space at a second of said two parallel end faces in a sealing manner, the outer faces of the battery housing forming a portion of a housing of the device, the battery housing protecting components of the device accommodated within the accommodation space.

2. The battery according to claim 1, whereas the accommodation space is accessible from an outside in such a way that the portion of the device can be inserted into said accommodation space.

3. The battery according to claim 1, whereas the second of said two parallel end faces which is situated opposite said first end face is closed off by the covering face.

4. The battery according to claim 3, whereas contact connections are arranged on the first end face of the battery.

5. The battery according to claim 1, whereas contact connections are arranged on one of the outer faces of the battery housing which adjoins the accommodation space.

6. The battery according to claim 1, whereas the battery housing is composed of an outer housing part and an inner housing part, with the two housing parts being welded to one another in a gas-tight manner in particular.

7. The battery according to claim 1, whereas the outer faces of the battery housing are produced from a gas-tight and chemicals-resistant plastic, in particular from an liquid crystal polymer.

8. The battery according to claim 1, whereas the electrode is wound, with a winding of the wound electrode wrapping around the accommodation space.

9. The battery according to claim 8, whereas a ratio between a winding width and a winding height of the wound electrode is at least 5:1.

10. A device with a battery according to claim 1, whereas a portion of the device is accommodated in the accommodation space of the battery in an assembled state.

11. The device according to claim 10, whereas the device has a base plate, in particular a printed circuit board, which can be releasably fixed, in particular screw-connected, on the first end face of the battery, the components of the device being mounted on the base plate, and with the components being accommodated in the accommodation space of the battery in the assembled state and being electrically contacted by contact connections of the battery.

12. The device according to claim 11, whereas the components comprise a safety circuit, a charging circuit and a transmission coil.

13. A device with a battery, the battery comprising a battery housing and an electrode which is accommodated in the battery housing, whereas outer faces of the battery housing form a shape of a hollow body which has an accommodation space, whereas at least a portion of the device to be supplied with power by the battery is accommodated in the accommodation space of the battery in an assembled state, so that an outer casing surface of the battery housing forms a portion of a housing of the device, whereas the device has a base plate, in particular a printed circuit board, which can be releasably fixed, in particular screw-connected, on an entrance-side end face of the battery, with components of the device being mounted on the base plate, and with the components being accommodated in the accommodation space of the battery in the assembled state and being electrically contacted by contact connections of the battery.

* * * * *